US012783315B2

(12) United States Patent
Guillemot

(10) Patent No.: US 12,783,315 B2
(45) Date of Patent: Nov. 3, 2026

(54) METHOD AND SYSTEM FOR EXECUTING TASKS ON A PROCESSING UNIT

(71) Applicant: Aptiv Technologies AG, Schaffhausen (CH)

(72) Inventor: Patrice Guillemot, Vannes (FR)

(73) Assignee: Aptiv Technologies AG, Schaffhausen (CH)

( * ) Notice: Subject to any disclaimer, the term of this patent is extended or adjusted under 35 U.S.C. 154(b) by 420 days.

(21) Appl. No.: 18/583,933

(22) Filed: Feb. 22, 2024

(65) Prior Publication Data

US 2024/0289174 A1 Aug. 29, 2024

(30) Foreign Application Priority Data

Feb. 24, 2023 (EP) .................................... 23315041

(51) Int. Cl.

*G06F 9/50* (2006.01)
*B60W 50/04* (2006.01)
*G06F 9/48* (2006.01)

(52) U.S. Cl.

CPC ......... *G06F 9/5038* (2013.01); *B60W 50/045* (2013.01); *B60W 2050/046* (2013.01); *G06F 9/4843* (2013.01); *G06F 9/4881* (2013.01); *G06F 9/5027* (2013.01)

(58) Field of Classification Search

CPC .... G06F 9/5038; G06F 9/4881; G06F 9/4843; G06F 9/5027; B60W 50/045; B60W 2050/046
See application file for complete search history.

(56) References Cited

U.S. PATENT DOCUMENTS

| | | | | |
|---|---|---|---|---|
| 9,465,664 | B1 * | 10/2016 | Miller | G06F 9/4887 |
| 2016/0246646 | A1 * | 8/2016 | Craciunas | G06F 9/4881 |
| 2016/0364267 | A1 * | 12/2016 | Varadarajan | G06F 9/4881 |
| 2018/0039514 | A1 | 2/2018 | Liao | |
| 2019/0034223 | A1 * | 1/2019 | Yang | G06F 9/4881 |
| 2021/0365275 | A1 * | 11/2021 | Vattikuti | G06Q 10/109 |

FOREIGN PATENT DOCUMENTS

CN 106250218 B 12/2016

OTHER PUBLICATIONS

Extended European Search Report for EP 23315041.6, 10 pages Jul. 25, 2023.

* cited by examiner

*Primary Examiner* — Michael W Ayers
(74) *Attorney, Agent, or Firm* — Miller Johnson

(57) ABSTRACT

A method includes providing a task scheduling plan to a system. The plan includes, for each task of a plurality of tasks, a plurality of time intervals and, for each time interval, a budget value. The method includes determining, by the system, each target time interval that is at least partially overlapped by one or more time intervals with higher or equal task priority level. The method includes for each determined target time interval, determining a duration of budget overlapping based on the budget values of the one or more time intervals, and checking if the target time interval is equal or greater than the budget value of the target time interval increased by the determined duration of budget overlapping. The method includes, in response to the checking being successful, determining that the task scheduling plan is valid and transmitting the valid task scheduling plan to an execution system.

13 Claims, 4 Drawing Sheets

| **Task T1 :** | **Task T2 :** | **Task T3 :** |
|---|---|---|
| $P_1=12$ | $P_2=4$ | $P_3=6$ |
| $\Delta t_1=0$ | $\Delta t_2=2$ | $\Delta t_3=3$ |
| $D_1=3$ | $D_2=2$ | $D_3=4$ |
| $TPB_1$ value=1 | $TPB_2$ value=0,5 | $TPB_3$ value=3 |
| $PrL_1 = 2$ | $PrL_2 = 3$ | $PrL_3 = 1$ |

Determination of OABu for a pair of time intervals

METHOD AND SYSTEM FOR EXECUTING TASKS ON A PROCESSING UNIT

CROSS-REFERENCE TO RELATED APPLICATIONS

This application claims priority to EP 23315041 filed Feb. 24, 2023, the entire disclosure of which is incorporated by reference.

FIELD

The present disclosure relates to a method for executing a plurality of tasks in a computer system including one or more processing units. Such a method can be used to execute tasks in a vehicle.

BACKGROUND

In the automotive industry, AUTOSAR (AUTomotive Open System ARchitecture) is a partnership of vehicle manufacturers, suppliers, service providers and companies from the automotive industry with the objective to create and establish an open and standardized software architecture for automotive electronic control units (ECUs).

AUTOSAR has developed the concept of Logical Execution Time (LET). The LET concept ensures time and value determinism of data exchange and execution of executable tasks, or tasks, in a computer system.

According to the AUTOSAR LET concept, the execution of each task is confined to fixed periodic time intervals, called the LET (Logical Execution Time) intervals. The LET intervals of each task are specified by fixed parameters including a period, an offset, and a duration. The task can be activated at any time within a LET interval. However, each task has to be completely executed once within each time interval.

In a computer system including one or more processing units or core units or cores, each processing unit or core can be responsible for executing a plurality of tasks. In operation, the processing unit executes the plurality of tasks based on a predetermined task scheduling plan including LET intervals assigned to the different tasks. The processing unit executes one task at a time and, when necessary, performs pre-emption of tasks in accordance with priorities assigned to the different tasks. A priority assignment strategy, such as DMS (Deadline Monotonic Scheduling), RMS (rate-monotonic scheduling), CAPA (Criticality-As-Priority-Assignment) or a hybrid approach, can be used to assign priority to the different tasks.

In a system, high-criticality tasks, e.g. steering or damper control, may be integrated with less critical tasks on the same processing unit or core. Such a mixed-criticality system has to deal with safety requirements. For example, an error in a low-criticality task must not compromise the correct functioning of any task with higher criticality.

Timing Protection is an AUTOSAR system service that monitors different parameters during the run time of the system. One of the monitored parameters is the execution time of a task. Thus, Timing Protection allows to monitor the execution time of a task. For this purpose, a budget for the execution time of each task is defined. It is also called an execution time budget or a Timing Protection Budget (TPB). The goal of the timing protection budget is to bind the execution time of a task. The budget value, also referred as the TPB value, represents a maximum permitted amount of time for executing the task within a LET time interval. If any task exceeds the budget during run time, this is interpreted as an error, and a recovery strategy for handling this error may be executed.

The Timing Protection Budget values of the tasks integrated on a processing unit or core are key parameters to ensure safety of the system.

The Timing Protection Budget (TPB) values of tasks are predetermined by developers using a scheduling tool, which requires time and effort. The determination of the TPB values of high critical tasks should require knowing the exact worst case execution time, which is hardly feasible. If the execution time of a task exceeds the predefined timing protection budget, then an error is detected and a recovery strategy is executed during the run time. It means that errors are detected during the run time of the system, after integration or implementation of the tasks on a processing unit or core, when the tasks are executed by the processing unit or core based on a predetermined task scheduling plan. At this stage, the safety of the system may be compromised, for example in case of an error having an impact on a highly critical task.

Therefore, there is a need for improving the safety of a system configured to execute a plurality of tasks with criticality levels.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure concerns a method for executing a plurality of tasks on at least one processing unit in an execution system, based on a task scheduling plan and in accordance with task priority levels, comprising: providing, to a scheduling system, a task scheduling plan for the processing unit, the task scheduling plan including, for each task, a plurality of time intervals and, for each time interval, a budget value representing a maximum permitted amount of time for executing the task within the time interval; performing by the scheduling system the steps of: determining each target time interval that is at least partially overlapped by one or more time intervals with higher or equal task priority level, for each determined target time interval, determining a duration of budget overlapping based on the budget values of the one or more time intervals with higher or equal task priority level, and checking if the target time interval is equal or greater than the budget value of the target time interval increased by the determined duration of budget overlapping; if the step of checking is successful for each determined target time interval, determining that the task scheduling plan is valid and transmitting the valid task scheduling plan to the execution system.

With the above method, the number of errors during the run time, i.e. while the processing unit executes the tasks in accordance with the valid task scheduling plan, is reduced. The scheduling system checks in advance, before the run time, if the budgets of the time intervals have enough time to execute within the duration of the time intervals. The task scheduling plan is implemented on the processing unit or core, only if it is valid, i.e., if it has been successfully checked. This allows to avoid the exceeding budgets in the task scheduling plan.

In an embodiment, the method may comprise a step of executing, by the processing unit of the execution system, the plurality of tasks based on the valid task scheduling plan received from the scheduling system.

In an embodiment, the method may comprise, if the task scheduling plan is not valid, a step of modifying, by the scheduling system, the task scheduling plan.

Advantageously, the step of modifying the task scheduling plan includes reducing the budget value of at least one time interval. This allows to reduce one or more exceeding budget values. Alternatively, or additionally, the step of modifying the task scheduling plan may include transferring at least one task from the processing unit to another processing unit of the execution system.

In an embodiment, the step of determining a duration of budget overlapping for each determined target time interval comprises: determining one or more pairs of associated time intervals overlapping one another, each pair including the target time interval and one time interval with a task priority level higher or equal to the task priority level of the target time interval; computing, for each pair of time intervals, an overlapping amount of budget representing an amount of the budget of the time interval with higher or equal task priority level, that overlaps the target time interval, assigning the overlapping amount of budget to the target time interval; cumulating the one or more overlapping amounts of budget assigned to the target time interval to determine the duration of budget overlapping for the target time interval.

In an embodiment, the steps of determining one or more pairs of associated time intervals and computing, for each pair of associated time intervals, an overlapping amount of budget are carried out by iterating on successive task priority levels in a decreasing order starting from the highest task priority level.

In an embodiment, the step of computing, for each pair of time intervals, an overlapping amount of budget includes: determining an overlapping start time, based on the start times of the two time intervals; determining an overlapping end time, based on the end times of the two time intervals; determining an overlapping duration, based on the determined overlapping start time and overlapping end time; determining an end time of the budget of the time interval with equal or higher task priority level; determining a time shift of the end time of the budget of the time interval with equal or higher task priority level relative to the overlapping start time and selecting the maximal value between the determined time shift and zero; determining the overlapping amount of budget by selecting the minimal value between the selected maximal value and the determined overlapping duration.

For each task, the corresponding time intervals can be periodic, and can have a fixed duration and a given time offset with respect to a reference time.

Advantageously, the step of checking the task scheduling plan may be performed over a hyper-period, the hyper-period corresponding to the least common multiple of the periods of all tasks, increased by the greatest offset of time interval.

In an embodiment, the step of executing the plurality of tasks is performed in the execution system that is separate from the scheduling system. For example, the execution system is included in a vehicle, and the scheduling system is external to the vehicle. The scheduling system may be located at a vehicle manufacturing or maintenance site, or in a remote server. In another embodiment, the scheduling system may be internal to the vehicle.

In an embodiment, the method comprises a step of generating, by the scheduling system, the task scheduling plan.

The present disclosure also concerns a scheduling system configured to carry out those steps of the method previously defined that are performed by the scheduling system.

The present disclosure also concerns a system including a scheduling system and an execution system including at least one processing unit, the system being configured to carry out the steps of the method previously defined.

In an embodiment, the execution system is included in a vehicle and the scheduling system is external to the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The Other features, purposes and advantages of the disclosure will become more explicit by reading the detailed statement of the non-restrictive embodiments made with reference to the accompanying drawings.

In the drawings, reference numbers may be reused to identify similar and/or identical elements.

DETAILED DESCRIPTION

Introduction

Figure 1:
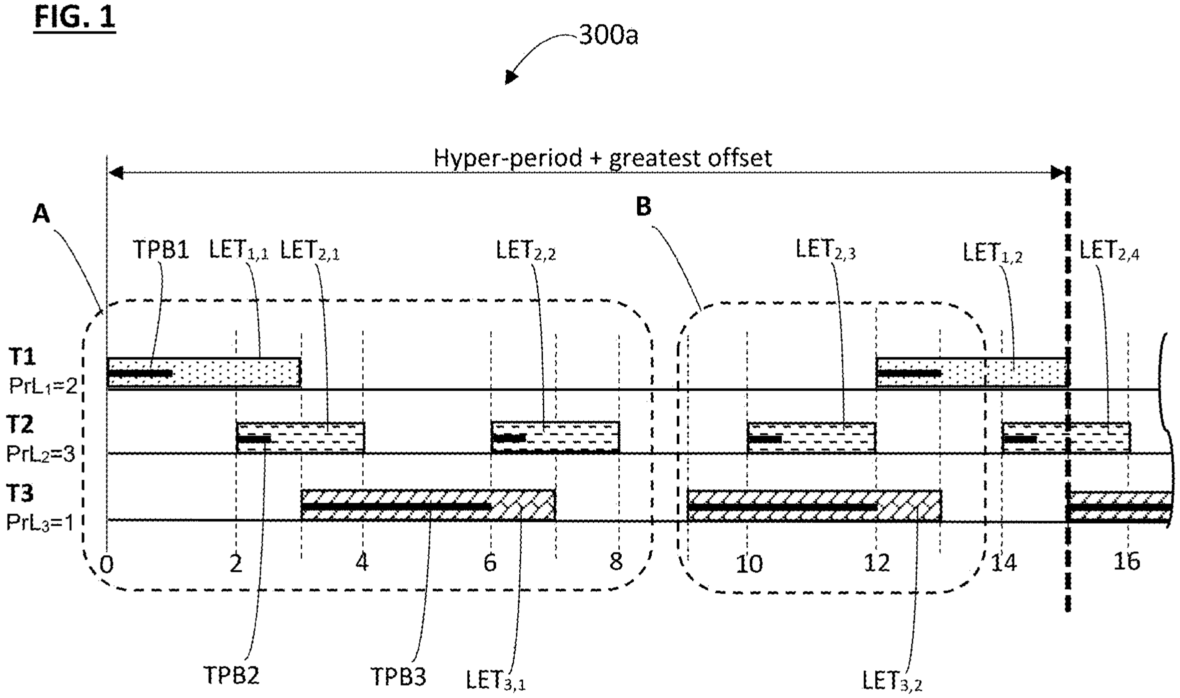
FIG. 1 represents a part of a task scheduling plan, according to an embodiment.

The present disclosure relates to a method for executing a plurality of tasks on at least one processing unit 110 in a computer system 100, referred as the execution system 100. In an embodiment, the execution system is included in a vehicle, so that the tasks may be executed by a single-core based ECU or a multi-core based ECU in the vehicle.

A task, or executable task, can be defined as a sequence of programmed or software instructions that can be managed independently by a scheduler assigning resources including for example a processing unit or core, to perform the tasks.

The computer system, or execution system, 100 is implemented with hardware and software. In an embodiment, it includes one or more processing units or cores 110 and software or application(s) 120 configured to run on the processing unit 110. The software or application(s) 120 include a plurality of executable tasks Ti, with 1≤i≤N. The software or application(s) 120 may be stored in memory within the processing unit or core 110.

In an embodiment, the execution system 100 includes an operating system 140 responsible for scheduling and/or controlling the execution of the plurality of tasks Ti, with 1≤i≤N. The operating system 140 is configured to run on the processing unit 110.

The execution system 100 may further comprise an interface 130 for receiving a task scheduling plan for a processing unit or core 110.

In an embodiment, the execution system 100 has one processing unit or core 110 and the processing unit 110 may be configured to execute the plurality of tasks Ti, with 1≤i≤N. In the present embodiment, when executing the tasks Ti, with 1≤i≤N, the processing unit 110 is configured to perform one task at a time. The execution of several tasks may be multiplexed, but only one slot or part of a task is executed at a time.

Furthermore, the processing unit or core 110 is configured to execute each task Ti over scheduled time intervals in accordance with a task scheduling plan. It means that the execution of each task is confined the time intervals specifically scheduled for the task. The task may be activated at any time during each time interval. In addition, the task must or should be completely executed once during each time interval. If any task is not completely executed once during a time interval, an error may be detected by the execution system 100.

In an embodiment, the time intervals for executing each task are periodic and can be specified by the following parameters, represented in FIG. 1, including: a period or periodicity P, an offset Δt relative to a reference time $t_0$, and a duration D.

In an embodiment, the time intervals may be LET (Logical Execution Time) intervals defined by AUTOSAR, for example in the specification AUTOSAR "Specification of Timing Extensions", identification number 411, that is part of Release R22-11, paragraph 3.7.

The time intervals related to any task Ti, with 1≤i≤N, are referred as $LET_{i,j}$, with j=1, 2, . . . and represents a time interval index of a sequence of times intervals for executing the task Ti.

In the present disclosure, a budget for the execution time of each task Ti, also called an execution time budget, is configured for any time interval $LET_{i,j}$ related to the task Ti, in the execution system 100. For each time interval $LET_{i,j}$ scheduled for a task Ti, a budget value, also referred as a Timing Protection Budget or TPB value, is assigned and represents a maximum permitted amount of time for executing the task within the time interval. In the present embodiment, the budget value is the same for all time intervals related to a given task. For the sake of clarity, TPBi represents the budget configured for any time interval $LET_{i,j}$ scheduled for the task Ti. The budget allows to bind the execution time of the task. During the run time in the execution system 100, if any task Ti exceeds the budget TPBi, this may be interpreted as an error, and a recovery strategy for handling this error may be executed by the execution system 100.

In an embodiment, priority levels or values are assigned to the different tasks Ti, with 1≤i≤N, for example by using a priority assignment algorithm such as DMS (Deadline Monotonic Scheduling), RMS (rate-monotonic scheduling), CAPA (Criticality-As-Priority-Assignment), a hybrid approach or any other priority assignment approach. The priority level of any task Ti, with 1≤i≤N, will be referred as $PrL_i$. In the present embodiment, some tasks Ti may be with equal priority levels. In another embodiment, the different tasks Ti have priority levels different from each other.

A task scheduling plan 300 dedicated to the processing unit 110 is configured in the execution system 100. It includes, for each of the plurality of tasks Ti, with 1≤i≤N, a plurality of time intervals $LET_{i,j}$ with j=1, 2, . . . and, for each time interval $LET_{i,j}$, a budget value TPBi representing a maximum permitted amount of time for executing the task Ti within the time interval $LET_{i,j}$. In the present embodiment, the budget TPBi is the same for all time intervals $LET_{i,j}$ with j=1, 2, . . . of the same task Ti. As previously indicated, the time intervals dedicated for executing any task Ti are periodic, based on a period $P_i$, and have an offset $\Delta t_i$ relative to a reference time $t_0$, and a duration Di.

The task scheduling plan 300 also includes the different priority levels $PrL_i$ assigned to the different tasks Ti, with 1≤i≤N, respectively.

The processing unit 110 is configured to perform the plurality of tasks Ti, with 1≤i≤N, in accordance with the configured task scheduling plan 300, by executing one task at a time and carrying out task preemption based on the task priority levels. Preemption is the act of temporarily interrupting an executing task, with the intention of resuming it at a later time. More precisely, the operating system 140 executes the task scheduling plan 300 on the processing unit 110. The execution of a task is temporarily interrupted by the operating system 140 if another task of higher priority is scheduled to be executed at the same time, in accordance with the task scheduling plan 300.

Furthermore, in an embodiment, two or more tasks may be configured with the same priority level. The tasks of equal priority level do not preempt each other but are executed sequentially, which finally results in the same behavior as if the tasks preempt each other.

The task scheduling plan 300 may be configured by a computer system 200, referred as a scheduling system 200, that will be described later. The scheduling system 200 may be separate, different from the execution system 100. The two systems 100, 200 may be able to communicate through a communication network or channel. In an embodiment, the scheduling system 200 is external to the vehicle and the execution system 100 is included in the vehicle.

FIG. 1 shows a graphical representation of a task scheduling plan 300, according to an illustrative example. Let's consider that this task scheduling plan 300 of FIG. 1 has been configured by the scheduling system 200.

The task scheduling plan 300 illustrated in FIG. 1 includes three tasks T1, T2, T3. The priority levels $PrL_1$, $PrL_2$, $PrL_3$ of the tasks T1, T2 and T3 are as follows: $PrL_i$=2; $PrL_2$=3; $PrL_3$=1. In other words, T2 is the task with the highest priority, T3 is the task with the lowest priority, and T1 is the task with the intermediate priority.

The parameters of the time intervals of the tasks T1, T2, T3 of FIG. 1 are as follows:

| Task T1: | Task T2: | Task T3: |
|---|---|---|
| $P_1 = 12$<br>$\Delta t_1 = 0$<br>$D_1 = 3$<br>$TPB_1$ value = 1 | $P_2 = 4$<br>$\Delta t_2 = 2$<br>$D_2 = 2$<br>$TPB_2$ value = 0.5 | $P_3 = 6$<br>$\Delta t_3 = 3$<br>$D_3 = 4$<br>$TPB_3$ value = 3 |

In FIG. 1, the budget values TPBi of each time interval $LET_{i,j}$ is schematically represented by an horizontal black bar within the corresponding time interval $LET_{i,j}$.

The scheduling system 200 is configured to: receive or be provided with a task scheduling plan 300 dedicated to one processing unit 110 of the execution system 100, check the validity of the task scheduling plan 300, if the task scheduling plan is valid, transmit it to the execution system 100, for example through a communication network or channel; and if the task scheduling plan is not valid, modify the task scheduling plan 300.

A task scheduling plan 300 is considered as valid if, during the run time in the execution system 100, i.e., when the tasks Ti, with 1≤i≤N, are executed by the processing unit 110 in the execution system 100 in accordance with the task scheduling plan 300, any task Ti has enough time to execute within the execution time of the budget TPBi for all time intervals $LET_{i,j}$ of the task Ti.

In an embodiment, the scheduling system 200 includes a checking module 220 for checking the validity of a task scheduling plan 300, a transceiver 230 for transmitting the task scheduling plan 300 to the execution system 100, if it has been determined as valid, and a scheduler 210 configured to modify or correct the task scheduling plan 300 if it has been determined as not valid.

The checking module 220 has the function, in case that time intervals of different tasks configured to run on or be executed by the same processing overlap, of verifying that the budgets of the tasks have enough time to execute within the corresponding time intervals. For that purpose, the checking module 220 uses an algorithm that will be described in the description of the method.

The scheduler 210 has the function of adapting or modifying or correcting a task scheduling plan that has been determined as not valid by the checking module 220. In an embodiment, the scheduler 210 is configured to assist a user or developer to modify the task scheduling plan to turn it valid. The modified scheduling plan may then be checked by the checking module 220 before transmission to the execution system 100, only if it is determined as valid.

The scheduler or scheduling tool suite 210 may also be configured to generate a task scheduling plan for a processing unit or core. In an embodiment, the scheduler 210 is configured to assist a user or developer in the task of creating or generating one or more task scheduling plans for one or more processing units.

The scheduler 210 may include: a first tool responsible for producing a visible or graphical "task scheduling plan", also called a LET Design, under control of a user, that comprises a graphical user interface; and a second tool responsible for creating the task scheduling plan for the operating system 140, configured to convert the LET Design produced by the first tool to a scheduling plan that can be used by the operating system 140. This second tool also checks that the scheduling plan is valid.

The scheduling system 200 may also include user interface means 220 allowing a user or developer to interact with the scheduling system 200.

The scheduling system 200 is implemented with hardware and software. In an embodiment, it includes a processor and software or application(s) configured to run on the processor and provide the functions of creating, checking and/or modifying a task scheduling plan.

Figure 2:
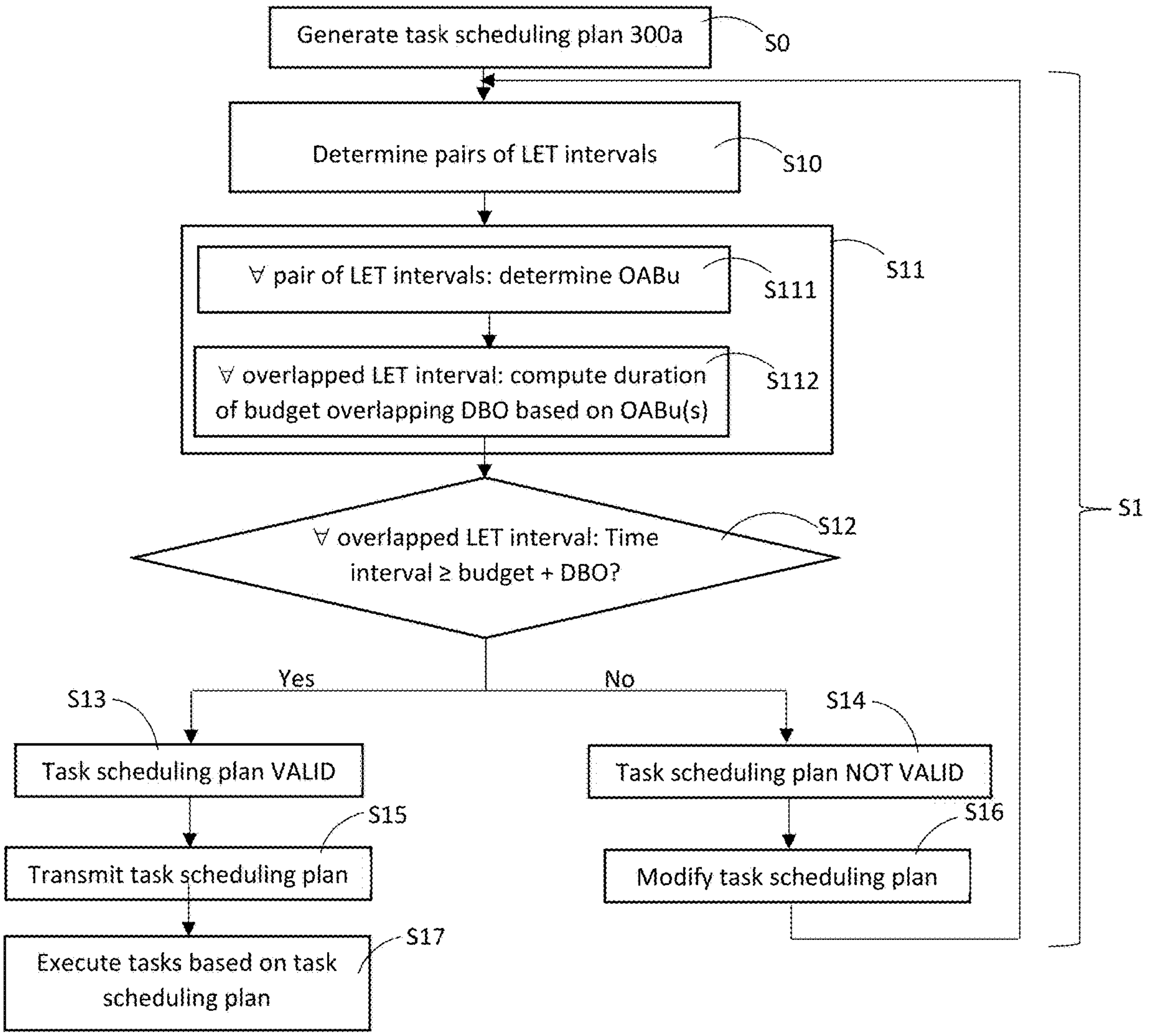
FIG. 2 represents a flowchart of a method for executing a plurality of tasks on one processing unit, according to an embodiment.

A method for executing the plurality of tasks Ti, with 1≤i≤N, on the processing unit 110 in the execution system 100, according to an embodiment, will now be described, with reference to FIG. 2. This method corresponds to the operation of the global or distributed system including the scheduling system 200 and the execution system 100. In an embodiment, the scheduling system 200 and the execution system 100 may be combined.

The method includes a first phase of producing a task scheduling plan 300 for the processing unit 110, and a second phase of executing the tasks in accordance with the produced task scheduling plan 300.

The first phase is carried out by the scheduling system 200. The second phase is carried out by the execution system 100.

First Phase: Production of Task Scheduling Plan(s)

The goal of the first phase is to produce one or more task scheduling plans for one or more processing units or cores of the execution system 100, for example for one or more ECUs in a vehicle. Each task scheduling plan produced is for one processing unit or core.

For the sake of clarity, let's consider that, in the first phase, the goal is to produce a task scheduling plan 300 for one processing unit or core 110 of the execution system 100.

In a step S0, an initial task scheduling plan 300*a* for the processing unit 110 is provided to the scheduling system 200. For example, the initial task scheduling plan 300*a* may be the task scheduling plan illustrated in FIG. 1. In the step S0, the initial task scheduling plan 300*a* may be generated by the scheduler 210 of the scheduling system 200, under control of a user or developer. Alternatively, the initial task scheduling plan 300*a* may be created by another system and/or a developer, not represented, and provided to or received by the scheduling system 200 via the transceiver 230, in the step S0.

As previously described, the task scheduling plan 300*a* includes, for each of the plurality of tasks Ti, with 1≤i≤N, a plurality of time intervals $LET_{i,j}$ with j=1, 2, . . . and, for each time interval $LET_{i,j}$, a budget value TPBi. The budget value is here the same for all time intervals $LET_{i,j}$ with j=1, 2, . . . of a same task Ti. The time intervals for executing a task Ti may be periodic, based on a period $P_i$, and have an offset $\Delta t_i$ relative to a reference time $t_0$, and a duration Di. The task scheduling plan 300*a* also includes different priority levels $PrL_i$ assigned to the different tasks Ti, with 1≤i≤N, respectively.

It is assumed that: budget values are specified for all time intervals $LET_{i,j}$ with 1≤i≤N and j=1, 2, . . . ; the execution of the task with the highest priority and the corresponding execution time budget start at the start time or date, also called release time or date, of the corresponding time interval; and the execution time budget of any time interval starts at the start time or date of the time interval, unless the task that is scheduled to be executed within the execution time budget is pre-empted by another task of higher priority or is performed after another task of equal priority.

The first phase further comprises a step S1 of checking the validity of the task scheduling plan 300*a*, carried out by the scheduling system 200. The step S1 may be performed over a hyper-period of time corresponding to the least common multiple or LCM of the periods of all tasks increased by the greatest offset of time interval. In the example of FIG. 1, the LCM value is 12 time units and the greatest offset is 3 time units. Therefore, the period corresponding to the hyper-period increased by the greatest offset has a duration of 15 time units.

In the step S1, the checking module 220 determines each time interval, referred as a target time interval, that is overlapped at least partially by one or more time intervals with higher or equal task priority level, in a step S10, and then estimates or determines a duration of budget overlapping for each target time interval determined, based on the budget values of the one or more time intervals with higher or equal task priority levels, overlapping the target time interval, in a step S11. More precisely, the duration of budget overlapping for each target time interval is estimated based on the one or more time intervals with higher or equal task priority levels, the execution time budgets of the one or more time intervals with higher or equal task priority levels, and the target time interval, as explained later in more detail. The steps S10 and S11 will be described in more detail later.

In the present disclosure, a time interval that is overlapped at least partially by one or more time intervals with higher or equal task priority is referred as a "target time interval", or an "overlapped time interval". The one or more time intervals with higher or equal task priority level may be called "overlapping time intervals" for the target time interval. Furthermore, two time intervals that overlap one another at least partially form a pair of associated time intervals or a pair of time intervals.

Then, the checking module 220 checks if each target time interval determined is equal or greater than the execution time budget of the target time interval increased by the determined duration of budget overlapping, in a checking step S12. In other words, for each target time interval determined in the step S10, the checking module 220 determines if the duration of the target time interval is equal or greater than the budget value of the target time interval increased by the duration of budget overlapping determined for the target time interval.

If the checking step S12 is successful for each target time interval determined in the step S10, i.e., if each determined target time interval is equal or greater than the execution time budget of the target time interval increased by the duration of budget overlapping determined for the target time interval, the checking module 220 determines that the task scheduling plan 300 is valid, in a step S13.

After the step S13, the valid task scheduling plan 300 is transmitted to the execution system 100, in a step S14.

If the checking step S12 is not successful for at least one target time interval determined in the step S10, i.e. if at least one target time interval is less than the execution time budget of the target time interval increased by the duration of budget overlapping determined for the target time interval, the checking module 220 determines that the task scheduling plan 300 is not valid, in a step S15. Furthermore, the scheduling system 200 may be configured to indicate exactly where the error would occur in the task scheduling plan 300 through a graphical user interface.

After the step S14, the task scheduling plan 300 is modified or corrected, for example by the scheduler 210, in a step S16.

After modification S16, the task scheduling plan 300 can be checked again, by performing the steps S10 to S12. Then, it is transmitted to the execution system 100 only if it is determined as valid in the step S13.

To determine the duration of budget overlapping for any target time interval $LET_{i,j}$, the checking module 220: determines one or more pairs of associated time intervals that at least partially overlap one another, each pair including the target time interval and one time interval with a task priority level higher than or equal to the task priority level of the target time interval, in the step S10; computes, for each pair of associated time intervals, an overlapping amount of budget OABu representing an amount of the execution time budget of the time interval with higher or equal task priority level, that overlaps the target time interval, and assigns the overlapping amount of budget OABu to the target time interval, in a step S111; and cumulates the one or more overlapping amounts of budget assigned to the target time interval to estimate or determine the duration of budget overlapping for the target time interval, in a step S112.

The steps S111 and S112 are part of the step S11.

The steps S10 and S111 of determining one or more pairs of associated time intervals and computing, for each pair of associated time intervals, an overlapping amount of budget are carried out by iterating on the successive task priority levels, in a decreasing order starting from the highest task priority level.

More precisely, during a first iteration, the checking module 220 starts with the time intervals of the task with the highest priority level. In the example of FIG. 1, the checking module 220 starts with the time intervals of task T2. For each time interval of task T2, the checking module 220 determines the time intervals of lower or equal priority level that are at least partially overlapped by the time interval with the highest priority to identify pairs of associated time intervals. Then, in the step S111, for each pair of associated time intervals, an amount of the execution time budget of the time interval with higher or equal task priority, that overlaps the target time interval, is determined to compute an overlapping amount of budget OABu that is assigned to the target time interval, so as to determine the total duration of budget overlapping for the target time interval.

During the next iteration, the checking module 220 proceeds in the same manner as above described, with the time intervals of the task with the next priority level, in a decreasing order, and so on.

Figure 3:
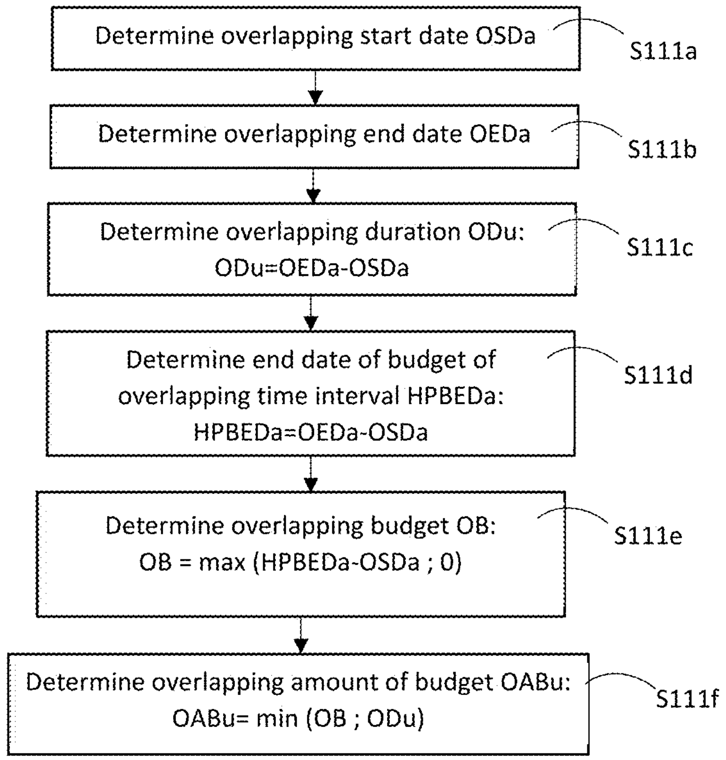
FIG. 3 represents a flow chart of a process for determining an overlapping amount of budget from a OABu performed for a pair of associated time intervals, the two time intervals overlapping at least partially each other, according to an embodiment.
Figure 4:
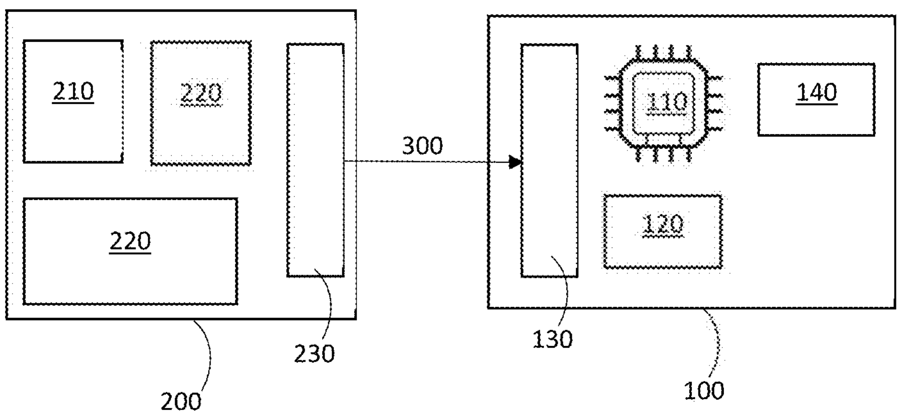
FIG. 4 represents a system configured to carry out the method of FIG. 2, according to an embodiment.

The step S111 of computing, for each pair of associated time intervals, an overlapping amount of budget OABu to be assigned to the target time interval includes the steps S111*a* to S111*f*, described below with reference to FIG. 3.

As previously indicated, each pair of time intervals includes two time intervals overlapping at least partially one another, and the task priority level of one of the two time intervals being higher than and equal to the task priority level of the other time interval, referred as the target time interval.

In the step S111*a*, an overlapping start time or date OSDa is determined, based on the respective start times or dates of the two time intervals. More precisely, OSDa is the maximal date between the two start times or dates.

In the step S111*b*, an overlapping end time or date OEDa is determined, based on the end times or dates of the two time intervals. More precisely, OEDa is the minimal date among the two end times or dates.

In the step S111*c*, an overlapping duration ODu is determined based on the determined overlapping start time and overlapping end time. More precisely, ODu is equal to the difference between OEDa and OSDa: ODu=OEDa−OSDa.

In the step S111*d*, an end time or date of the budget of the time interval with higher or equal task priority level, here referred as HPBEDa (High Priority Budget End Date), the budget starting from the start time of the time interval with higher or equal task priority level, is determined by adding the budget value of the time interval with higher or equal task priority level to the start time of the time interval with higher or equal task priority level.

In the step S111*e*, a time shift of the end time or date of the budget of the time interval with higher or equal task priority, relative to the overlapping start time, is determined, and then the maximal value between the determined time shift and zero is selected. The selected value is referenced as the overlapping budget or OB (Overlapping Budget). In other words, the difference HPBEDa-OSDa is computed. If the difference HPBEDa-OSDa is negative, the value zero is selected and OB is equal to zero. If the difference HPBEDa-OSDa is positive, the value of this difference HPBEDa-OSDa is selected and OB is equal to HPBEDa-OSDa.

Finally, in the step S111*f*, the overlapping amount of budget OABu from the time interval with higher or equal task priority level is determined by selecting the minimal value between the selected maximal value OB, that is either zero or HPBEDa−OSDa, and the determined overlapping duration ODu. In other words, the overlapping amount of budget OABu is equal to the minimal value between OB and ODu. This overlapping amount of budget OABu is assigned to the target time interval of the pair of time intervals, to determine later its total duration of budget overlapping.

As previously indicated, in the step S112, the one or more overlapping amounts of budget OABu assigned to each target time interval are cumulated to determine the total duration of budget overlapping for the target time interval.

To illustrate the algorithm of checking the validity of a task scheduling plan, let's consider the task scheduling plan 300, referred as 300*a* wherein "a" means that this is a first or initial task scheduling plan, of FIG. 1. For the sake of clarity only, the task scheduling plan 300*a* is divided into two parts A and B.

The task T2 has the highest priority and the task T3 has the lowest priority. The checking module 220 starts iterating with the time intervals of the task T2, and determines the pairs of associated time intervals including a time interval of the task T2 overlapping a time interval of lower or same task priority that is overlapped by the time interval of the task T2. This is done over one hyper-period.

Part A of the Task Scheduling Plan

In part A, the high priority time interval $LET_{2,1}$ of task T2 overlaps the low priority time interval $LET_{1,1}$ of task T1 and the low priority time interval $LET_{3,1}$ of task T3.

Let's consider the pair $LET_{2,1}$-$LET_{1,1}$ of associated time intervals.

$LET_{2,1}$-$LET_{1,1}$

The time interval $LET_{2,1}$ of the task T2 partially overlaps the time interval $LET_{1,1}$ of the task T1, and the task T2 has a task priority level higher than the task T1. The checking module 220 determines or computes the overlapping amount of budget OABu from the high priority, overlapping, time interval $LET_{2,1}$ for or relative to the low priority, overlapped, time interval $LET_{1,1}$ by performing the steps below.

- S111*a*: determining an overlapping start time OSDa=max ($LET_{2,1}$ start date, $LET_{1,1}$ start date)=max (0,2)=2
- S111*b*: determining an overlapping end time OEDa=min ($LET_{2,1}$ end date, $LET_{1,1}$ end date)=min (3,4)=3
- S111*c*: determining an overlapping duration ODu=OEDa−OSDa=3−2=1
- S111*d*: determining an end time or date of the budget of the high priority time interval HPBEDa=$LET_{2,1}$ start date+$LET_{2,1}$ budget value=2+0.5=2.5.
- S111*e*: determining a time shift of the end time of the budget of the high priority time interval relative to the overlapping start time, OB=max (HPBEDa−OSDa, 0)=max (2.5−2, 0)=max (0.5, 0)=0.5
- S111*f*: determining the overlapping amount of budget from the high priority time interval $LET_{2,1}$, referred as OABu, to be assigned to the target time interval $LET_{1,1}$, OABu=min (OB, ODu)=min (0.5, 1)=0.5

Since the time interval $LET_{1,1}$ is not overlapped by any other time interval of higher or same task priority level, the checking module 220 determines that the duration of budget overlapping DBO for the target time interval $LET_{1,1}$ is equal to the overlapping amount of budget OABu determined in the step S111*f*, here equal to 0.5, in the step S112.

In the step S12, the checking module 220 checks if the duration of budget overlapping DBO for the target time interval $LET_{1,1}$ is equal or greater than the budget TPB1 of the target time interval $LET_{1,1}$ increased by the determined duration of budget overlapping. In the present case, the duration D1 of the time interval $LET_{1,1}$ is 3, the budget value TPB1 of the time interval $LET_{1,1}$ is 1, and the duration of budget overlapping is 0.5. As 3>1+0.5, the budget of the target time interval $LET_{1,1}$ has enough time $t_0$ execute the task T1 within the time interval $LET_{1,1}$.

Let's now consider the pair $LET_{2,1}$-$LET_{3,1}$ of associated time intervals and the pair $LET_{2,2}$-$LET_{3,1}$ of associated time intervals.

$LET_{2,1}$-$LET_{3,1}$

The time interval $LET_{2,1}$ of the task T2 partially overlaps the time interval $LET_{3,1}$ of the task T3, and the task T2 has a higher task priority level than the task T3. The checking module 220 determines or computes the overlapping amount of budget OABu from the high priority time interval $LET_{2,1}$ for or relative to the target time interval $LET_{3,1}$ by performing the steps below

- S111*a*: determining an overlapping start time OSDa=max ($LET_{2,1}$ start date, $LET_{3,1}$ start date)=max (3, 2)=3
- S111*b*: determining an overlapping end time OEDa=min ($LET_{2,1}$ end date, $LET_{3,1}$ end date)=min (7, 4)=4
- S111*c*: determining an overlapping duration ODu=OEDa−OSDa=4−3=1
- S111*d*: determining an end time or date of the budget of the high priority time interval HPBEDa=$LET_{2,1}$ start date+$LET_{2,1}$ budget value=2+0.5=2.5.
- S111*e*: determining a time shift of the end time of the budget of the high priority time interval relative to the overlapping start time, OB=max (HPBEDa−OSDa, 0)=max (2.5−3, 0)=max (−0.5, 0)=0
- S111*f*: determining the overlapping amount of budget from the high priority time interval $LET_{2,1}$, referred as OABu, to be assigned to the target time interval $LET_{3,1}$, OABu=min (OB, ODu)=min (0, 1)=0

$LET_{2,2}$-$LET_{3,1}$

The time interval $LET_{2,2}$ of the task T2 partially overlaps the time interval $LET_{3,1}$ of the task T3, and the task T2 has a task priority level higher than the task priority level of the task T3. The checking module 220 determines or computes the overlapping amount of budget OABu from the high priority time interval $LET_{2,2}$ for or relative to the target time interval $LET_{3,1}$ by performing the steps below

- S111*a*: determining an overlapping start time OSDa=max ($LET_{2,2}$ start date, $LET_{3,1}$ start date)=max (3, 6)=6
- S111*b*: determining an overlapping end time OEDa=min ($LET_{2,2}$ end date, $LET_{3,1}$ end date)=min (7, 8)=7
- S111*c*: determining an overlapping duration ODu=OEDa−OSDa=7−6=1
- S111*d*: determining an end time or date of the budget of the high priority time interval HPBEDa=$LET_{2,2}$ start date+$LET_{2,2}$ budget value=6+0.5=6.5.
- S111*e*: determining a time shift of the end time of the budget of the high priority time interval relative to the overlapping start time, OB=max (HPBEDa−OSDa, 0)=max (6.5−6, 0)=max (0.5, 0)=0.5
- S111*f*: determining the overlapping amount of budget from the high priority time interval $LET_{2,2}$, referred as OABu, to be assigned to the target time interval $LET_{3,1}$, OABu=min (OB, ODu)=min (0.5, 1)=0.5

In the step S112, the checking module 220 determines the duration of budget overlapping DBO for the target time interval $LET_{3,1}$ by cumulating the overlapping amounts of budget assigned to the time interval $LET_{3,1}$, namely the one from time interval $LET_{2,1}$ and the one from time interval $LET_{2,2}$. In the present case, this duration of budget overlapping DBO for the time interval $LET_{3,1}$ is equal to 0+0.5=0.5.

In the step S12, the checking module 220 checks if the duration of budget overlapping DBO for the target time interval $LET_{3,1}$ is equal or greater than the budget TPB3 of the target time interval $LET_{3,1}$ increased by the determined duration of budget overlapping. In the present case, the duration D3 of the time interval $LET_{3,1}$ is 4, the budget value TPB3 of the time interval $LET_{3,1}$ is 3, and the duration of budget overlapping is 0.5. Since 4>3+0.5, the budget of the target time interval $LET_{3,1}$ has enough time $t_0$ execute the task T3 within the time interval $LET_{3,1}$.

Part B of the Task Scheduling Plan

In part B, the time interval $LET_{2,3}$ of the task T2 partially overlaps the time interval $LET_{3,2}$ of the task T3. Furthermore, the time interval $LET_{1,2}$ of the task T1 also partially overlaps the time interval $LET_{3,2}$ of the task T3.

Let's consider the pair $LET_{2,3}$-$LET_{3,2}$ of associated time intervals and the pair $LET_{1,2}$-$LET_{3,2}$ of associated time intervals.

$LET_{2,3}$-$LET_{3,2}$

The time interval $LET_{2,3}$ partially overlaps the time interval $LET_{3,2}$, and the task T2 has a task priority level higher than the task priority level of the task T3. The checking module 220 determines or computes the overlapping amount of budget OABu from the high priority time interval $LET_{2,3}$ for or relative to the target time interval $LET_{3,2}$ by performing the steps below

S111*a*: determining an overlapping start time OSDa=max ($LET_{2,3}$ start date, $LET_{3,2}$ start date)=max (9, 10)=10

S111*b*: determining an overlapping end time OEDa=min ($LET_{2,3}$ end date, $LET_{3,2}$ end date)=min (13, 12)=12

S111*c*: determining an overlapping duration ODu=OEDa−OSDa=12−10=2

S111*d*: determining an end time or date of the budget of the high priority time interval HPBEDa=$LET_{2,3}$ start date+$LET_{2,3}$ budget value=10+0.5=10.5.

S111*e*: determining a time shift of the end time of the budget of the high priority time interval relative to the overlapping start time, OB=max (HPBEDa−OSDa, 0)=max (10.5−10, 0)=max (0.5, 0)=0.5

S111*f*: determining the overlapping amount of budget from the high priority time interval $LET_{2,3}$, referred as OABu, to be assigned to the target time interval $LET_{3,2}$, OABu=min (OB, ODu)=min (0.5, 2)=0.5

$LET_{1,2}$-$LET_{3,2}$

The time interval $LET_{1,2}$ partially overlaps the time interval $LET_{3,2}$, and the task T1 has a task priority level higher than the task priority level of the task T3. The checking module 220 determines or computes the overlapping amount of budget OABu from the high priority time interval $LET_{1,2}$ for or relative to the target time interval $LET_{3,2}$ by performing the steps below

S111*a*: determining an overlapping start time OSDa=max ($LET_{1,2}$ start date, $LET_{3,2}$ start date)=max (9, 12)=12

S111*b*: determining an overlapping end time OEDa=min ($LET_{1,2}$ end date, $LET_{3,2}$ end date)=min (13, 15)=13

S111*c*: determining an overlapping duration ODu=OEDa−OSDa=13−12=1

S111*d*: determining an end time or date of the budget of the high priority time interval HPBEDa=$LET_{1,2}$ start date+$LET_{1,2}$ budget value=12+1=13.

S111*e*: determining a time shift of the end time of the budget of the high priority time interval relative to the overlapping start time, OB=max (HPBEDa−OSDa, 0)=max (13−12, 0)=max (1, 0)=1

S111*f*: determining the overlapping amount of budget from the high priority time interval $LET_{1,2}$, referred as OABu, to be assigned to the target time interval $LET_{3,2}$, OABu=min (OB, ODu)=min (1, 1)=1

In the step S112, the checking module 220 determines the duration of budget overlapping DBO for the target time interval $LET_{3,2}$ by cumulating the overlapping amounts of budget assigned to the time interval $LET_{3,2}$, namely the one from time interval $LET_{2,3}$ and the one from time interval $LET_{1,2}$. In the present case, this duration of budget overlapping DBO for the time interval $LET_{3,2}$ is equal to 0.5+1=1.5.

In the step S12, the checking module 220 checks if the duration of budget overlapping DBO for the target time interval $LET_{3,2}$ is equal or greater than the budget TPB3 of the target time interval $LET_{3,2}$ increased by the determined duration of budget overlapping DBO. In the present case, the duration D3 of the time interval $LET_{3,2}$ is 4, the budget value TPB3 of the time interval $LET_{3,2}$ is 3, and the duration of budget overlapping is 1.5. Since 4<3+1.5, the checking module 220 determines that the budget of the target time interval $LET_{3,2}$ has not enough time to execute the task T3 within the time interval $LET_{3,2}$. In other words, the budget TPB3 has not enough time to allow the execution of the task T3 bound by the budget TPB3 within the time interval $LET_{3,2}$.

After the above step S12, the method proceeds with the step S14 wherein the checking module 220 determines that the task scheduling plan 300*a* is not valid.

Then, the step S16 of modifying the task scheduling plan 300*a* is performed. The step S16 may be performed by the scheduler 210 under control of a user or developer. The step S16 of modifying the task scheduling plan 300 may include at least one of the steps of: reducing the budget value of the one or more time intervals; and transferring at least one of the tasks Ti, with 1≤i≤N, from the processing unit or core 110, referred as processing unit or core 110*a*, to another processing unit or core, referred as processing unit or core 110*b*, of the execution system 100.

Another option to is to change the processing unit 110*a* of the execution system 100. This allows to reduce the budget values of all the time intervals.

A modified task scheduling plan, referred as "300*b*", is produced by the scheduler 210 in the step S16.

Then, the checking module 220 may check the modified task scheduling plan 300*b*, by performing the steps S10 to S12 previously described.

The task scheduling plan 300 may be modified several times until it is determined as valid by the checking module 220.

The task scheduling plan 300 is transmitted to the execution system 100 only if it is valid, in the step S15.

Second Phase: Execution of the Tasks Ti

In the second phase, the execution system 100 receives the valid task scheduling plan 300 and provides it to the processing unit 110.

Then, in a step 517, the processing unit 110 executes the tasks Ti, with 1≤i≤N, based on the received task scheduling plan 300.

The present disclosure allows to reduce the number of errors during the run time. Indeed, the scheduling system checks in advance, before the run time, if the execution time budgets of the time intervals have enough time $t_0$ execute within the duration of the time intervals. The task scheduling plan is implemented on the processing unit or core, only if it has been successfully checked. This allows to avoid the exceeding budgets.

In another embodiment, the scheduling system 200 and the execution system 100 may be included in the vehicle. In that case, the scheduling system 200 may receive a task scheduling plan from the execution 100 and perform the steps S10 to S12 to check if the task scheduling plan is valid. If it is valid, the scheduling system 200 may transmit the validity information to the execution system. If it is not valid, the scheduling system 200 may modify the task scheduling plan.

FINAL CONSIDERATIONS

Although an overview of the inventive subject matter has been described with reference to specific example embodiments, various modifications and changes may be made to these embodiments without departing from the broader spirit and scope of embodiments of the present invention. For example, various embodiments of features thereof may be mixed and matched or made optional by a person of ordinary skill in the art. Therefore, the Detailed Description is not to be taken in a limiting sense, and the scope of various embodiments is defined only by the appended claims, along with the full range of equivalents to which such claims are entitled.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for executing a plurality of tasks on at least one processing unit in an execution system based on a task scheduling plan and in accordance with task priority levels, the method comprising:

providing, to a scheduling computer system, a task scheduling plan for the at least one processing unit, wherein the task scheduling plan includes, for each task, a plurality of time intervals and, for each time interval, a budget value representing a maximum permitted amount of time for executing the task within the time interval;

determining, by the scheduling computer system, at least one target time interval that is at least partially overlapped by one or more time intervals with higher or equal task priority level;

for each determined target time interval:

determining, by the scheduling computer system, a duration of budget overlapping based on the budget values of the one or more time intervals with higher or equal task priority level; and checking, by the scheduling computer system, if the target time interval is equal or greater than the budget value of the target time interval increased by the determined duration of budget overlapping, wherein determining the duration of budget overlapping for each determined target time interval includes:

determining one or more pairs of associated time intervals overlapping one another, wherein each pair includes the target time interval and one time interval with a task priority level higher or equal to the task priority level of the target time interval; and computing, for each pair of time intervals, an overlapping amount of budget representing an amount of the budget of the time interval with a higher or equal task priority level, that overlaps the target time interval, and wherein computing, for each pair of time intervals, the overlapping amount of budget includes:

determining an overlapping start time based on the start times of the pair of time intervals;

determining an overlapping end time based on the end times of the pair time intervals;

determining an overlapping duration based on the determined overlapping start time and overlapping end time;

determining an end time of the budget of the time interval with equal or higher task priority level;

determining a time shift of the end time of the budget of the time interval with equal or higher task priority level relative to the overlapping start time and selecting a maximal value between the determined time shift and zero;

determining the overlapping amount of budget by selecting a minimal value between the selected maximal value and the determined overlapping duration;

assigning the overlapping amount of budget to the target time interval; and cumulating the one or more overlapping amounts of budget assigned to the target time interval to determine the duration of budget overlapping for the target time interval;

in response to the checking being successful for each determined target time interval:

determining, by the scheduling computer system, that the task scheduling plan is valid; and transmitting, by the scheduling computer system, the valid task scheduling plan to the execution system; and executing the plurality of tasks on the at least one processing unit of the execution system based on the valid task scheduling plan.

2. The method of claim 1 further comprising executing, by the at least one processing unit of the execution system, the plurality of tasks based on the valid task scheduling plan received from the scheduling computer system.

3. The method of claim 1 further comprising, in response to the task scheduling plan being not valid, modifying, by the scheduling computer system, the task scheduling plan.

4. The method of claim 3 wherein modifying the task scheduling plan includes reducing the budget value of at least one time interval and/or transferring at least one task from the at least one processing unit to another processing unit of the execution system.

5. The method of claim 1 wherein determining one or more pairs of associated time intervals and computing, for each pair of associated time intervals, an overlapping amount of budget are carried out by iterating on successive task priority levels in a decreasing order starting from a highest task priority level.

6. The method of claim 1 wherein, for each task, corresponding time intervals are periodic, and have a fixed duration and a given time offset with respect to a reference time.

7. The method of claim 6 wherein checking the task scheduling plan is performed over a hyper-period, the hyper-period corresponding to a least common multiple of the periods of all tasks, increased by an offset of the time interval that is greatest.

8. The method of claim 1 wherein executing the plurality of tasks is performed in the execution system that is separate from the scheduling computer system.

9. The method of claim 1 further comprising generating, by the scheduling computer system, the task scheduling plan.

10. A scheduling computer system comprising:

memory configured to store instructions; and at least one processor configured to execute the instructions, wherein the instructions include:

providing a task scheduling plan for a processing unit, wherein the task scheduling plan includes, for each task of a plurality of tasks, a plurality of time intervals and, for each time interval, a budget value representing a maximum permitted amount of time for executing the task within the time interval;

determining at least one target time interval that is at least partially overlapped by one or more time intervals with higher or equal task priority level;

for each determined target time interval:

determining a duration of budget overlapping based on the budget values of the one or more time intervals with higher or equal task priority level; and checking if the target time interval is equal or greater than the budget value of the target time interval increased by the determined duration of budget overlapping, wherein determining the duration of budget overlapping for each determined target time interval includes:

determining one or more pairs of associated time intervals overlapping one another, wherein each pair includes the target time interval and one time interval with a task priority level higher or equal to the task priority level of the target time interval; and computing, for each pair of time intervals, an overlapping amount of budget representing an amount of the budget of the time interval with a higher or equal task priority level, that overlaps the target time interval, and wherein computing, for each pair of time intervals, the overlapping amount of budget includes:

determining an overlapping start time based on the start times of the pair of time intervals;

determining an overlapping end time based on the end times of the pair time intervals;

determining an overlapping duration based on the determined overlapping start time and overlapping end time;

determining an end time of the budget of the time interval with equal or higher task priority level;

determining a time shift of the end time of the budget of the time interval with equal or higher task priority level relative to the overlapping start time and selecting a maximal value between the determined time shift and zero;

determining the overlapping amount of budget by selecting a minimal value between the selected maximal value and the determined overlapping duration;

assigning the overlapping amount of budget to the target time interval; and cumulating the one or more overlapping amounts of budget assigned to the target time interval to determine the duration of budget overlapping for the target time interval; and in response to the checking being successful for each determined target time interval:

determining that the task scheduling plan is valid; and transmitting the valid task scheduling plan to an execution system that executes the plurality of tasks on at least one processing unit of the execution system based on the valid task scheduling plan.

11. A system comprising:

a scheduling computer system including:

memory configured to store instructions; and at least one processor configured to execute the instructions; and an execution system including at least one processing unit, wherein the instructions include:

providing, by the scheduling computer system, a task scheduling plan for the at least one processing unit, wherein the task scheduling plan includes, for each task of a plurality of tasks, a plurality of time intervals and, for each time interval, a budget value representing a maximum permitted amount of time for executing the task within the time interval;

determining, by the scheduling computer system, at least one time interval that is at least partially overlapped by one or more time intervals with higher or equal task priority level;

for each determined target time interval:

determining, by the scheduling computer system, a duration of budget overlapping based on the budget values of the one or more time intervals with higher or equal task priority level; and checking, by the scheduling computer system, if the target time interval is equal or greater than the budget value of the target time interval increased by the determined duration of budget overlapping, wherein determining the duration of budget overlapping for each determined target time interval includes:

determining one or more pairs of associated time intervals overlapping one another, wherein each pair includes the target time interval and one time interval with a task priority level higher or equal to the task priority level of the target time interval; and computing, for each pair of time intervals, an overlapping amount of budget representing an amount of the budget of the time interval with a higher or equal task priority level, that overlaps the target time interval, and wherein computing, for each pair of time intervals, the overlapping amount of budget includes:

determining an overlapping start time based on the start times of the pair of time intervals;
determining an overlapping end time based on the end times of the pair time intervals;
determining an overlapping duration based on the determined overlapping start time and overlapping end time;
determining an end time of the budget of the time interval with equal or higher task priority level;
determining a time shift of the end time of the budget of the time interval with equal or higher task priority level relative to the overlapping start time and selecting a maximal value between the determined time shift and zero;
determining the overlapping amount of budget by selecting a minimal value between the selected maximal value and the determined overlapping duration;
assigning the overlapping amount of budget to the target time interval; and
cumulating the one or more overlapping amounts of budget assigned to the target time interval to determine the duration of budget overlapping for the target time interval;
in response to the checking being successful for each determined target time interval:
determining, by the scheduling computer system, that the task scheduling plan is valid; and
transmitting, by the scheduling computer system, the valid task scheduling plan to the execution system; and
executing the plurality of tasks on the at least one processing unit of the execution system based on the valid task scheduling plan.

12. The system of claim 11 wherein the scheduling computer system is separate from the execution system.

13. The system of claim 11 wherein the execution system is included in a vehicle and the scheduling computer system is external to the vehicle.

* * * * *